(12) United States Patent
Sinden

(10) Patent No.: US 11,314,339 B2
(45) Date of Patent: Apr. 26, 2022

(54) CONTROL DEVICE FOR DETECTION

(71) Applicant: SINDEN TECHNOLOGY LTD, Coventry (GB)

(72) Inventor: Andrew James Sinden, Coventry (GB)

(73) Assignee: SINDEN TECHNOLOGY LTD, Coventry (GB)

( * ) Notice: Subject to any disclaimer, the term of this patent is extended or adjusted under 35 U.S.C. 154(b) by 0 days.

(21) Appl. No.: 17/054,958

(22) PCT Filed: May 13, 2019

(86) PCT No.: PCT/GB2019/051303
§ 371 (c)(1),
(2) Date: Nov. 12, 2020

(87) PCT Pub. No.: WO2019/220086
PCT Pub. Date: Nov. 21, 2019

(65) Prior Publication Data
US 2021/0247852 A1     Aug. 12, 2021

(30) Foreign Application Priority Data

May 13, 2018 (GB) ..................... 1807749
Oct. 1, 2018 (GB) ..................... 1815961

(51) Int. Cl.
*G06F 3/03* (2006.01)
*A63F 13/219* (2014.01)
(Continued)

(52) U.S. Cl.
CPC .......... *G06F 3/0325* (2013.01); *A63F 13/219* (2014.09); *A63F 13/426* (2014.09); *G06F 3/0346* (2013.01); *G06F 3/0383* (2013.01)

(58) Field of Classification Search
CPC .... G06F 3/0325; G06F 3/0346; G06F 3/0383; A63F 13/219; A63F 13/426
See application file for complete search history.

(56) References Cited

U.S. PATENT DOCUMENTS

2001/0010514 A1  8/2001 Ishino
2005/0104849 A1  5/2005 Hoile
(Continued)

FOREIGN PATENT DOCUMENTS

GB    2448034 A     10/2008
JP    2003038849 A   2/2003

OTHER PUBLICATIONS

International Search Report and Written Opinion dated Jul. 26, 2019 of corresponding application No. PCT/GB2019/051303; 14 pgs.
(Continued)

*Primary Examiner* — Christopher E Leiby
(74) *Attorney, Agent, or Firm* — Maier & Maier, PLLC

(57) ABSTRACT

A method for detecting a display is provided, the method including receiving an image signal from an image detector; detecting, by an image processor, that the received image signal includes an image of at least a portion of a display; determining, by the image processor, an array of pixel coordinates of the received image signal that define at least a part of an outline of the display; calculating, based on the array of pixel coordinates and at least one centre pixel of the received image signal, an orientation of the image detector in relation to the display. An apparatus for detecting a display is also provided. The apparatus is configured to carry out the method and includes an image detector and an image processor configured to be in wired or wireless communication with a display.

17 Claims, 8 Drawing Sheets

(51) Int. Cl.
A63F 13/426 (2014.01)
G06F 3/0346 (2013.01)
G06F 3/038 (2013.01)

(56) References Cited

U.S. PATENT DOCUMENTS

| | | |
|---|---|---|
| 2005/0107160 A1 | 5/2005 | Cheng et al. |
| 2006/0023111 A1* | 2/2006 | DeMenthon .......... G06F 3/0346 348/360 |
| 2006/0176274 A1 | 8/2006 | Cheng et al. |
| 2009/0046061 A1 | 2/2009 | Denoue et al. |
| 2009/0153479 A1 | 6/2009 | Gu et al. |
| 2011/0124410 A1* | 5/2011 | Mao ........................ A63F 13/42 463/31 |
| 2014/0139455 A1* | 5/2014 | Argiro .................. G06F 3/0346 345/173 |
| 2014/0191957 A1 | 7/2014 | Cheng |

OTHER PUBLICATIONS

British Combined Search and Examination Report dated Nov. 28, 2018 of corresponding application No. GB1815961.6; 6 pgs.

\* cited by examiner

CONTROL DEVICE FOR DETECTION

FIELD

This invention relates to improvements in or relating to a method for detecting a display and an apparatus for carrying out the method, the apparatus comprising a control device and, in particular, the invention relates to a method for detecting a display device using a line of sight control device as a controller and an apparatus for carrying out the method comprising a line of sight control device to detect its alignment relative to a display device. In addition, the present invention relates to a line of sight control device to detect the display screen.

BACKGROUND

It is commonly known that some controllers can be used to interact with objects on a display screen. A user often uses a controller for many purposes. For example; for providing an indicator on a screen where the user is pointing; for detecting objects on a screen for entertainment purposes such as playing video games; and/or for using a controller for training and educational purposes. Unfortunately, many controllers used for detection can be inaccurate and do not truly reflect the position of where the user using the controller points to on a display screen. For gaming purposes, the controller can be used as a hand-held controller device or a gaming accessory such as a gun-style accessory. Many users in the past have enjoyed using lightgun technology for playing shooting games.

However, classic lightgun technology does not work on modern displays such as LCD/LED televisions or LCD projectors. Classic light guns use the fast line by line refresh of the cathode ray tube (CRT) that has precise timing. Modern LCD/LED televisions or LCD projectors process the image as a complete image and then refresh the display as a complete frame usually at a slower rate than a CRT. As a result, users who play classic lightgun computer games are not able to play with a classic lightgun on a modern television.

The current alternatives are using a mouse, keyboard and joystick to move the cursor or for a gun style solution putting some extra hardware such as infrared LEDs next to the television that can be detected at the front of the remote/gun to deduce approximately where the remote/gun is pointing on the display screen. This does not provide true line of sight response and provides a less accurate way to calculate where the control device is pointing at the display, unless the system goes through a calibration routine.

However, a calibration routine is often a time consuming process because a user must go through a calibration routine every time the user changes their position, angle and/or changes their equipment.

It is against this background that the invention has arisen.

SUMMARY

According to an aspect of the present invention, there is provided a method for detecting a display, the method comprising the steps of:
receiving an image signal from an image detection means;
detecting, by an image processor, that the received image signal comprises an image of at least a portion of a display;
determining, by the image processor, an array of pixel coordinates of the received image signal that define at least a part of an outline of the display;
calculating, based on the array of pixel coordinates and at least one centre pixel of the received image signal, an orientation of the image detection means in relation to the display.

According to another aspect of the invention, there is provided an apparatus configured to detect a display according to the method of the present invention, the apparatus comprising:
an image detection means; and
an image processor configured to be in wired or wireless communication with a display.

In some embodiments, the apparatus for detecting a display comprises:
a control device,
an artefact being applied to a display content within a display area of the display, wherein the applied artefact may be configured to aid the detection of the display,
an image detection means configured to capture an image comprising the display; and
an image processor for receiving a first signal from the image detection means, the image processor is configured to process the captured image to determine an array of image pixel coordinates of the display which is compared to an image pixel coordinates of the centre of the captured image, and
wherein the image processor further determines a pointing alignment of the control device in relation to the display on the basis of the determined image pixel coordinates to detect the display.

According to another aspect of the present invention, there is provided a computer-readable medium comprising instructions which, when executed by a processor, cause the processor to carry out the methods described herein.

In some embodiments, the applied artefact can be a background, foreground, a border or a partial border adapted to partially surround or completely surround the display content within the display area. The artefact may be partially transparent. The display area may be a display screen of the display.

In some embodiments, the background, foreground, partial border or the border may be applied to/around at least one edge or corner of the display area. In some embodiments, the applied artefact may be a rectangular or square border around the inner edge of the display content to assist the detection of the display area.

In some embodiments the artefact may be based on an algorithm that takes into account pixel attributes such as, but not limited to, pixel location, colour and brightness. The algorithm will then appropriately change pixel values such as, but not limited to, colour and brightness with the purpose of making the image recognition process easier and more accurate.

The apparatus may further comprise the application of additional artefacts around at least one edge or corner of the display content.

According to another aspect of the present invention there is provided, an apparatus for detecting a display device, the apparatus comprising:
a control device,
an artefact being applied to a display content within a display area of the display, wherein the applied artefact may be configured to aid the detection of the display,
an image detection means configured to capture an image comprising the display; and
an image processor for receiving a first signal from the image detection means, the image processor is configured to process the captured image to determine an array of image pixel coordinates of the display which is compared to an image pixel coordinates of the centre of the captured image, wherein the image processor further determines a pointing alignment of the control device in relation to the display on the basis of the determined image pixel coordinates to detect the display.

The apparatus of the present invention may be configured to detect, capture, collect multiple signals, process the captured image and analyse the captured image in real time to determine where the pointing alignment, position, angle and distance of the control device is in relation to the display. As the control device can be directly used for detecting the display, even if a user handling the control device changes their operating alignment/position, distance from the display or angle to the display the control device does not require calibration and recalibration. Thus, the apparatus of the present invention does not require a calibration routine when in use, which can significantly improve the control device for detecting, processing and analysing the image, and a user experience handling the control device. In another advantage, the apparatus of present invention does not require any external hardware for detecting the relative location of the display device, such as an infra-red LED array next to/or around the display device.

In addition, the present invention provides an advantage in that it can be used detect modem technology display devices such as LCD or LED, television screens, computer monitors, modem projector displays, mobile phone devices, tablets, cinematic screens or gaming devices.

It is also an advantage that the apparatus of the present invention may be able to provide a more accurate way to detect an object in the captured image, such as the display device.

The control device may be a line of sight control device. The control device may be a hand-held device such as a controller. The controller may be mobile and be operable by a user's left hand, right hand or both. The line of sight controller may comprise a suitable configuration or it may comprise a strap for the user's hand to grip the controller to operate the line of sight controller freely for example, the user can rotate the controller, move the controller from side to side and/or up or down.

In some alternative embodiments, the image processor may further determine the pointing alignment, position, angle and distance of the control device in relation to the display based on the image pixel coordinates.

Processing the captured image using the image processor, which may be a local image processor, reduces the transmission time for sending the processed data, and it may reduce the amount of hardware on an electronic device being controlled. The image processor may be configured to process multiple signals received from the image detections means in real time to determine the array of image pixel coordinates of the display. In some embodiments, processing of the captured image can be performed by the image processor on board the control device or the raw image/video input can be fed to an electronic device and be processed by the electronic device, such as a computer or a computer-implemented device. This reduces the amount of hardware required and the complexity of the hardware required in the control device.

In some embodiments, the apparatus may further comprise an electronic device which may be configured to provide an indicator to display the pointing alignment, position, angle or distance of the control device on the display. The electronic device may receive a second signal from the image processor and may send an output signal to the display device to display the pointing alignment/position of the control device on the display.

The indicator may be a computer mouse cursor or a targeting crosshair used to display the pointing alignment/position of the controller on the display such as a TV screen, a laptop screen, a computer screen, a projector screen, a cinematic screen, mobile phone screen, tablets, or on any other electronic screens.

This can be advantageous because the indicator can be used to accurately show where a user handling the control device is pointing to on the screen. The indicator may be programmable to enable it to automatically and accurately show where a user handling control device is pointing to on the screen. In some alternative embodiments, the control device may comprise an indicator for displaying the pointing alignment/position on the display device.

In some embodiments, an indicator may not be required. This may give a different user experience and the user may rely on the line of sight accuracy to know where they are pointing on the display.

In some embodiments, the indicator may be a tracking indicator such as a tracking cursor which can continually track and display the pointing alignment or position of the control device on the display screen.

In some embodiments, the apparatus of the present invention may further comprise the control device having a trigger input associated with a processor, the trigger input may be adapted to be triggered by a user which may be configured for operating a computer programme, thereby to enable the processor to send a further signal to an electronic device, the electronic device may be configured to respond to the trigger input and perform a plurality of outputs.

In some embodiments, the captured image can be processed by the image processor to remove background noise from the image gathered by the image detection means. This may provide a clearer image for image processing. In some cases, the image processor may remove background noise to provide a higher quality image for analysis.

In some embodiments, the captured image is processed by the image processor to enhance the image gathered by the image detection means. The enhanced image may provide a higher quality image which may make it easier for the image processor to recognise the image and process the captured image more efficiently. In some embodiments, the captured image could be manipulated to enhance the characteristics of the display in the captured image.

In some embodiments, the image detection means may be suitable for blob detection, edge detection, corner detection, quadrilateral detection, rectangle or square detection in the image.

In some embodiments, the processed image may be analysed/processed by the image processor to determine the array of coordinates of the display on the image based on one or more of the following: contour size, position, intensity, colour, brightness, velocity, shape, outline, edge, angle, light frequency, light polarisation, flickering, refresh rate, contrast and/or size of the display.

Preferably, the captured image may comprise a substantially rectangular-shaped or a substantially square-shaped display. A rectangular-shaped or square-shaped display device may comprise substantially sharp edges which may mean that the image detection means can easily detect the display on the captured image.

As the user may not be directly in front of the display, a rectangular or square display may appear to be a distorted quadrilateral on the captured image. The image processing may take into account this distortion when calculating a pointing location or position.

The captured image may comprise a display having an outer rectangular shape in order to allow the image processor to determine the array of image pixel coordinates of the display consistently with high accuracy.

In some embodiments, the captured rectangular-shaped or the square-shaped display may be analysed to determine an array of coordinates based on at least one corner or one or two edges of the display. The array of coordinates may be based on more than two or more different corners or edges of the display. Preferably, the image processor may be used to determine the array of coordinates based on four corners or edges of the rectangular-shaped display.

In some embodiments, the image processor may process the captured image to determine where the centre pixel coordinates in the image are in relation to the array of image pixel coordinates of the display. Preferably, the determined display coordinates being pointed at by the control device are represented as X horizontal percentage and Y vertical percentage.

Optionally, the determined coordinates are represented as a ratio of X horizontal percentage and Y vertical percentage.

By using X horizontal percentage and Y vertical percentage as coordinates, the image processor may be able to process and analyse the captured image with the display being at low resolution and/or at high resolution. In other words, the resolution of the display image is irrelevant.

In other embodiments, the determined coordinates may be represented as X horizontal and Y vertical pixel coordinates if the resolution of the display is known or X horizontal and Y vertical distance coordinates if the size of the display is known.

In some embodiments, the apparatus may further comprise at least one communication interface such as a USB interface, HDMI interface, a WIFI interface or Bluetooth wireless interface, wherein the communication interface may be configured to connect the control device to the image detection means, the image processor, the electronic device and/or a display device.

In some embodiments, the method may further comprise applying an image artefact, such as a white border or background, which can be applied to show on the display. The image artefact may also be partially transparent. Applying an image artefact to the display screen can optimise the accuracy of the controller and may also help reduce processing requirements. The image artefacts can be applied around the edge, on top of or in the background of the displayed content to make display recognition and processing easier for the processor. The image artefact may be any change to the display content that enhances the outline or the shape of the display to make display recognition and processing easier for the processor such as during image recognition processes.

In some embodiments, the apparatus may further comprise at least one power unit in the control device connected to a power source, which could be used to provide power to the image detection device and/or the image processor.

The image detection means may be a digital camera or it may be any electro-magnetic radiation image detection means. In some embodiments, the image detection means may be a video recorder, or a mobile phone device, or a webcam or any other devices that can be used for detecting an image.

In some embodiments, the display device can be a TV screen, or a projector screen or a cinematic screen. The TV screen may typically be a modern TV screen. In some embodiments, the TV screen may be a LCD TV screen or an LED TV screen.

An illuminated display device can be advantageous because it may enable the image detection means to detect and capture a clear image comprising the display. This may then allow the image processor to easily recognise and process the captured image comprising the display more efficiently. The image process can exclude pixels that do not match a minimum brightness. The brightness can be used as part of a noise removal process during image processing. Optionally, the shape, outline, size, contour level, gamma, angle, light polarisation, brightness, contrast, flickering, refresh rate, colour and/or size of the display may be useful to enable the image detection means to detect and capture a clear image that can be easily processed.

In some embodiments, the apparatus may further comprise a storage media for storing captured images, the array of coordinates of the display and/or the coordinates of the pointing alignment/position of the control device.

In another aspect of the invention there is provided, a method for detecting a display using an apparatus according to a previous aspect of the present invention, the method comprising the steps of:
  (i) capturing an image comprising the display using an image detection means;
  (ii) an image processor receiving a first signal from the image detection means; and
  (iii) processing the captured image using the image processor image to determine an array of image pixel coordinates of the display which is compared to an image pixel coordinates of the centre of the captured image;
wherein the image processor further determines a pointing alignment of the control device in relation to the display on the basis of the determined image pixel coordinates.

In another aspect of the invention, there is provided a method for detecting a display using an apparatus described above, the method comprising the steps of:
  (i) capturing an image comprising the display using an image detection means;
  (ii) applying an artefact to a display content within a display area of the display, an artefact being applied to a display content within a display area of the display, wherein the applied artefact is configured to aid the detection of the display,
  (iii) receiving, via an image processor, a first signal from the image detection means; and
  (iv) processing the captured image using the image processor image to determine an array of image pixel coordinates of the display which is compared to an image pixel coordinates of the centre of the captured image;
wherein the image processor further determines a pointing alignment of the control device in relation to the display on the basis of the determined image pixel coordinates to detect the display.

Preferably, the method may comprise the step of adding a rectangular or a square border around the inner edge of the display content to assist the detection of the display area. This may enhance the outline and shape of the display which can be used during the image recognition process to identify the display.

In some embodiments, the method may further comprise the step of displaying the pointing alignment/position of the control device on the display using an electronic device, which may be configured to provide an indicator. The electronic device may receive a second signal from the image processor and may send an output signal to display the pointing position of the control device on the display.

In some embodiments, determining the array of coordinates of the display may be based on contour size, position, intensity, colour, flickering, refresh rate, light frequency, brightness, light polarisation, velocity, shape, outline, contrast, angle or size of the display. In some embodiments, the user may change any one of following based on contour size, position, intensity, light frequency, light polarisation, colour, flickering, refresh rate, brightness, velocity, shape, contrast, angle or size of the display to optimise the detection of the display. In some embodiments, the method may further comprise the step of applying an image artefact to the display.

In some embodiments, the method may further comprise storing the captured image, the array of coordinates of the display device and/or the coordinates of the pointing alignment/position of the control device onto a storage media.

In some embodiments, the method may further comprise the step of calculating a changing distance, referred to as a Z axis, from the control device to the display. The Z axis can be calculated as the user operating the control device moves closer to the display or further away from the display.

In some embodiments, the method may further comprise the step of calculating an angle of the pointing alignment/position of the control device to the display screen.

In some embodiments, the method of the present invention may further comprise validating the captured image comprising the display by a further image processor, wherein the array of image pixel coordinates processed by the further processor based on one or more of the following: contour size, position, intensity, colour, flickering, refresh rate, light frequency, brightness, velocity, shape, outline, edge, angle, contrast, polarisation, and/or size of the display is validated by matching the determined image pixel coordinates determined by the image processor based on contour size, position, intensity, colour, flickering, refresh rate, light frequency, brightness, velocity, shape, outline, edge, angle, contrast, light polarisation and/or size of the display.

In a further aspect of the invention, there is provided a control device for detecting a display, the control device comprising:
  an image detection means configured to capture an image comprising the display,
  an artefact applied to a display content within a display area; and
  an image processor for receiving a first signal from the image detection means, the image processor is configured to process the captured image to determine an array of image pixel coordinates of the display which is compared to an image pixel coordinates of the centre of the captured image,
wherein the image processor further determines a pointing alignment of the control device in relation to the display on the basis of the determined image pixel coordinates.

In another aspect of the invention, there may be provided, a control device for detecting a display device, the control device comprising:
  an image detection means configured to capture an image comprising the display; and
  an image processor for receiving a first signal from the image detection means, the image processor is configured to process the captured image to determine an array of image pixel coordinates of the display which is compared to a centre image pixel coordinates in the captured image,
wherein the image processor further determines a pointing alignment of the control device in relation to the display on the basis of the determined image pixel coordinates.

In some embodiments, the control device may further comprise a trigger input associated with a processor, the trigger input can be adapted to be triggered by a user which may be configured for operating a computer programme, thereby to enable the processor to send a further signal to the electronic device, the electronic device may be configured to respond to the trigger input and perform a plurality of outputs. In some embodiments, the control device may comprise the electronic device.

In some embodiments, the control device may further comprise a vibration motor, speaker or a solenoid interconnected to or in association with the trigger input and/or additional inputs, and/or triggered by the electronic device, wherein the vibration motor, solenoid or speaker may be configured to provide feedback upon the trigger sensor being triggered by a user. As an example, the vibration motor can be used to provide haptic feedback. As another example, the solenoid can provide a recoil effect.

In some embodiments, the control device may further comprise an additional button and/or a scrolling wheel or an additional control or any other input controls. These additional buttons and scrolling wheel may provide a plurality of different functionality for the user controlling the control device. For example, the scrolling wheel may be useful to activate to scroll the content that may be displayed on the display device. The additional button may be used to control the image detection means. An additional control may be used to control the image artefacts added to the display content, for example changing one or more of the following but not limited to the thickness, size, shapes or colour of the border.

In another aspect of the invention, there is provided a kit for detecting a display according to any of the previous aspect of the invention, the kit comprising:
  a image detection means for capturing an image; and
  an image processor configured to process the captured image.

In some embodiments, the display can be a television, a laptop screen, a computer screen, a projector screen, a cinematic screen, mobile phone screen, tablet, or on any other electronic screens, wherein the display is a modem technology display screen such as an LCD or LED screen.

In some embodiments, a border could be added around the display content using a physical modification such as an illuminated neon strip. This physical method would still utilise the shape detection and brightness detection of the software method but would not require the ability to adapt the display content. This would be useful for example on an old arcade gaming machine where it is not possible to modify the display content.

BRIEF DESCRIPTION OF THE FIGURES

The invention will now be further and more particularly described, by way of example only, and with reference to the accompanying drawings, in which.

DETAILED DESCRIPTION OF THE EMBODIMENTS

As used herein, unless otherwise stated, the image processor may be defined as a processor which is processing the captured images and/or it may include processing user inputs such as buttons and triggers and/or sending communication signals to an electronic device comprising data relevant to the process e.g. captured images or calculated coordinates, or it may provide any other processing means required on the device.

Figure 1:
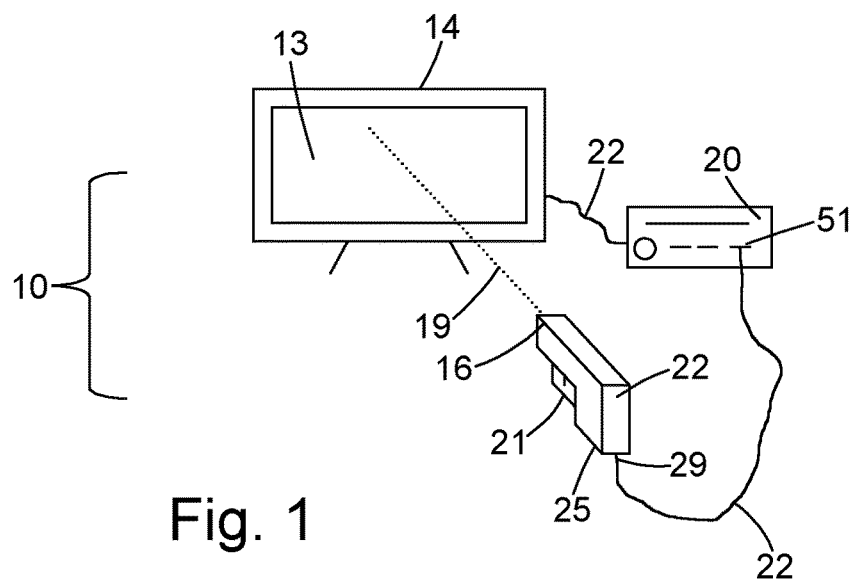
FIG. 1 shows an apparatus according to an aspect of the present invention.
Figure 2A:
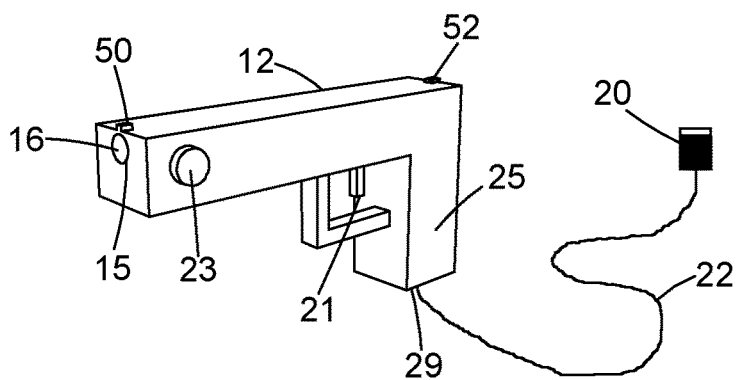
FIG. 2a, provides a side view of a control device according to FIG. 1.
Figure 2B:
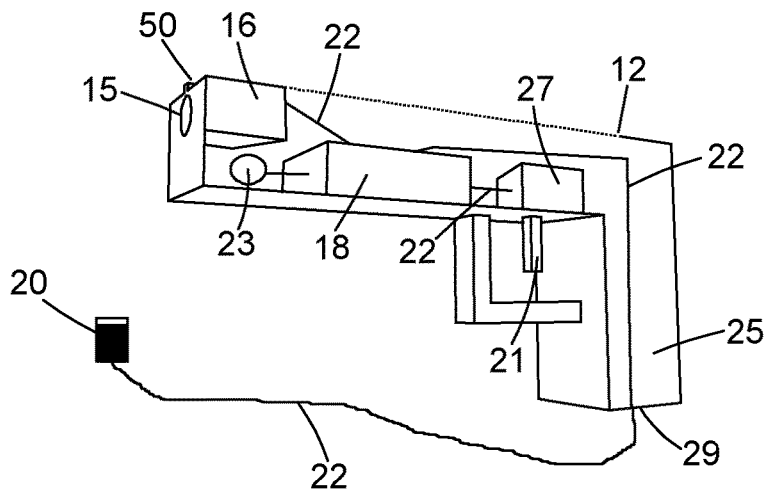
FIG. 2b, shows a cross sectional view of the control device according to FIG. 2a, FIG. 3a shows a captured image comprising a display.

Referring to FIGS. 1, 2a and 2b, there is provided an apparatus 10 for detecting a display device 14 such as a television. The apparatus 10 comprise a control device 12, an image detection means 16, which may be configured to capture an image comprising the display 13 and an image processor 18 for receiving a first signal from the image detection means 16. The image detection means 16 may be a digital camera or a webcam which can be used to take images or videos which comprises the display device 14. Alternatively, the image detection means 16 may be used to detect a live image. The image processor 18 may receive a first signal of the captured image from the image detection means 16 such as a camera. The image captured by the camera may then be processed by the image processor 18. The image processor may be in a form of a CPU/master unit on an electronic device 20 for example a computer device. Alternatively, the image processor may be built within the control device and/or the camera.

Figure 4:
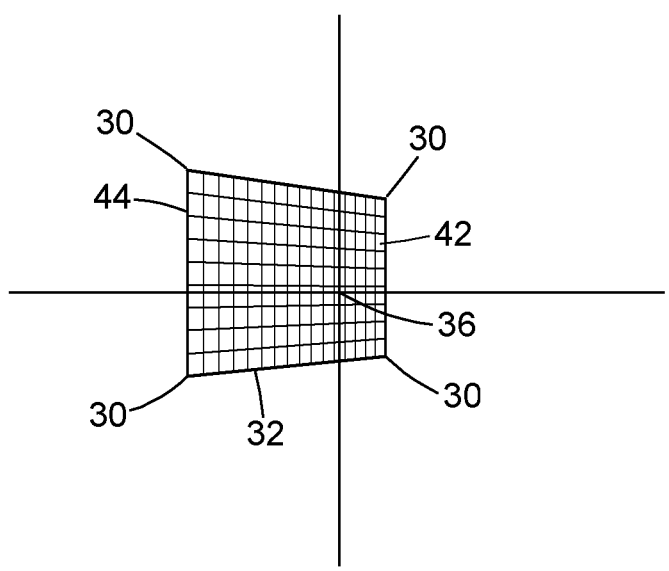

Referring to FIGS. 2a and 2b, there is shown an example of a control device 12. The control device may be a remote controller or it may be a gaming accessory device, such as a gun accessory as illustrated or modified game controller. In other examples, not illustrated in these figures it may be a mobile phone device or a computer. The control device may be used to calculate and provide feedback where the pointing alignment/position is at the display 13, as shown in FIG. 1. The control device 12 may operate at a distance from the display or the control device may operate at an angle to detect a distorted shape comprising the display, as shown in FIG. 4.

Figure 3A:
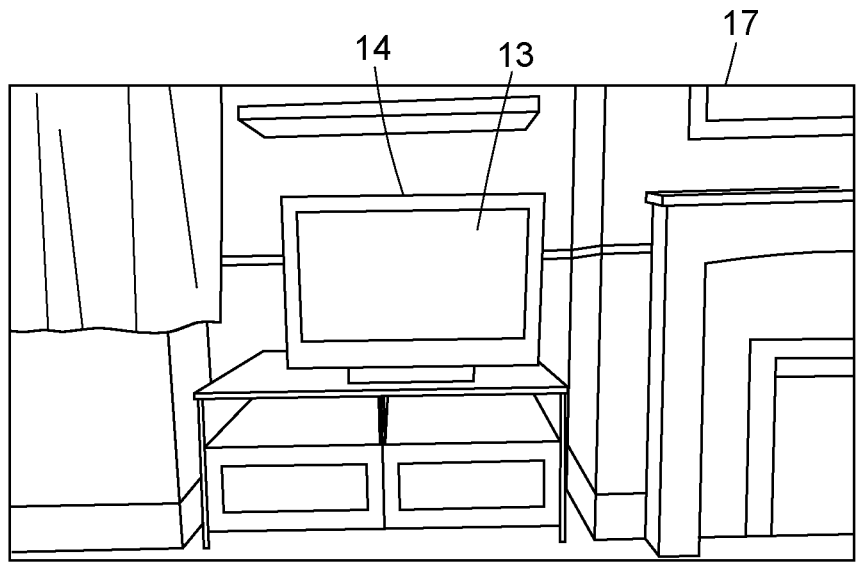
FIG. 3b shows a captured image comprising a display.
FIG. 3c shows a captured image comprising a display.
FIG. 3d shows an array of plotted coordinates of the display.
FIG. 3e shows an array of plotted coordinates of the display, FIG. 4 provides an illustration of a detecting a display at an angle according to FIGS. 1a, 1b, 2, 3a to 3e.
Figure 3B:
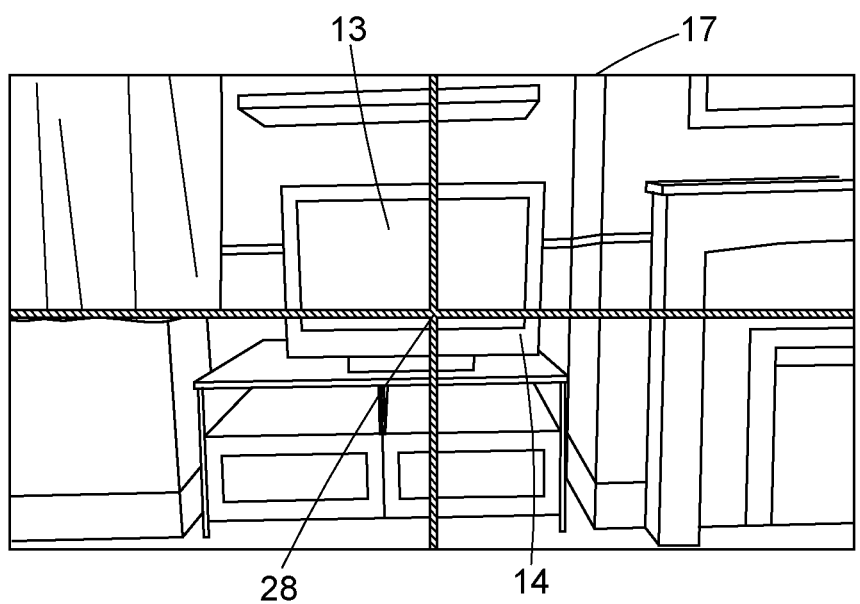

The control device may have an aperture 15 in which the image detections means 16 may be positioned in such a way to enable the lens of the image detection means 16 to capture an image. In some embodiments, the control device may have more than one aperture. In some embodiments, a plurality of image detection means may be provided. The camera 16 or any other image detection means may be built into the controller 12. Alternatively, the camera 16 may be mounted or attached on top of a surface of the control device 12. As the camera may be mounted onto the control device, the centre of the camera would point in line with a user's line of sight. Where the camera 16 points to may be equal to the pointing direction 19 of the control device 12. The camera then records an image comprising the display as shown in FIGS. 3a and 3b. The camera may take a 1D, 2D or 3D image.

The camera may take an image at any resolution e.g. at high or at low resolution. The image detection means may be connected to an electronic device 20 e.g. a computer using a communication interface such as through a USB cable or a HDMI cable 22. Furthermore, the camera or the control device may be connected to the electronic device 20 via Bluetooth or any other wireless communication means. For example, the wireless communication may utilise a wireless internet connection such as WIFI or 1G, 2G, 3G, 4G, 5G and beyond.

As shown in FIGS. 1, 2a and 2b, there is also shown a primary select control or a trigger input 21. The trigger input is interconnected with a trigger sensor/button 27 which is interconnected to the image processor 18 via the cable 22. The trigger input 21 can be associated with a processor 18. Furthermore, the trigger input 21 can be adapted to be triggered by a user which may be configured for operating a computer programme, thereby to enable the processor 18 to send a further signal to the electronic device 20. The electronic device may then be configured to respond to the trigger input and perform a plurality of outputs.

In other embodiments not shown in the accompanying drawings, the plurality of outputs may be configured to perform a variety of functionality including, but is not limited to, being triggered by the user to perform one or more of the following; a mouse click/movement, keyboard button press or joystick movement/button press.

The controller can have further additional controls 23 that may be operable by a user. The additional control 23 may be an operable control such a secondary trigger input, buttons or scroll wheels in which a particular functionality can be assigned/mapped towards providing the user benefit in the computer programme being operated. As an example, the secondary trigger input 23 may be associated with a mapped functionality that is similar to the function of a right-mouse click, when operable by the user. The controller may be a hand-held device. The controller can have a suitable surface 25 to allow a user to hold/grip the controller. As illustrated in FIGS. 1 and 2, the controller may also comprise at least one connection port 29 which can be connected to a USB port or a HDMI port.

In addition, the control device may have a visual front indicator 50 (front view) and a visual back indicator 52 which may be configured to allow a user to line up where the control device is pointing e.g. a gun sight.

As an additional feature the control device 12 could contain a display screen such as a LCD screen which may function as a line of sight indicator or gunsight. This display may be connected to the image processor in the control device. The image processor would output a zoomed in image from the control device camera possibly with an over-laid cross hair onto this additional screen. The image may be zoomed in at the centre of the image which is where the control device is pointing. This may be an additional way to indicate where the control device is pointing at to the user. The LCD screen may be used for outputting configuration options meaning the user can configure or control the device for feedback. The LCD screen may be a touchscreen to allow the user to add further inputs.

The image processor 18 may run a software algorithm to process the captured image 17, as shown in FIG. 3a, to determine an array of image pixel coordinates 34 of the corners of the display 13 in relation to a centre image pixel coordinates 36 or 28 in the captured image 17, as shown in FIGS. 3a, 3b, 3c, 3d and 3e. In FIGS. 3a and 3b, the centre image pixel 36 or 28 coordinates represents the pointing alignment/position or line of sight of the controller in relation to the display screen 13. The centre image pixel of the captured image is indicated by a crosshair 28.

The image processor 18 may be interconnected with the control device 12. In some embodiments, the image processor can send and/or receive a plurality of input or output signals to communicate with the control device. The image processor can be configured to send a second signal to an electronic device 20. The electronic device 20 may then provide an output signal to show the pointing alignment/position of the control device on the display via an indicator, such as a mouse cursor. Furthermore, the image processor may provide an output signal configured to enable a mouse movement/joy stick movement that corresponds to the pointing alignment/position of the control device on the display. Additionally, the trigger and additional buttons on the gun accessory may provide mouse clicks and/or joy stick button clicks.

The image processor may provide additional processing capabilities such as interpreting the control device controls for example the trigger input.

The electronic device such as a computer device 20 may be an external computer hardware that can be connected to the image processor, the control device, image detections means and/or the display device through a USB or a HDMI connection means 22. The electronic device can comprise a connection port such as a USB or a HDMI port 51.

In some embodiments, the computer device may be built within the control device. The control device could connect directly to a display and output content. The computer device 20 may be set up to receive a second signal from the image processor 18, which may be raw image data, so that the computer device can provide an output signal to display the cursor that corresponds to where the control device is pointing to at the display. In some embodiments, the output signal may be configured to display a constantly moving mouse cursor in line with where the camera is pointed on the television or only to move the cursor when then the trigger on the control device is clicked.

In some embodiments the display device could also include the computer device, for example, the display device may be a smart television.

Referring to FIGS. 3a, 3b and by way of example only, pointing the control device at exactly in the middle of the television would be equal to X horizontal percentage=50% and Y vertical percentage=50%. By using percentages it does not matter what the resolution or the aspect ratio of the display is. In the example illustrated in FIGS. 3a and 3b, the image resolution is 640 horizontal X pixel x 360 vertical Y pixel. The centre image pixel, as represented by a crosshair 28, has a pixel coordinates of 320 X horizontal; 180 Y vertical coordinates, which corresponds to the pointing alignment/position of the control device on the display.

Typically, the image processor 18 contains a software image recognition algorithm, which is used detect a display 13 having four edges and/or four corners. The display device 14 has a display screen 13. The display screen 13 may be a substantially rectangle-shaped or square-shaped display screen. The display would typically be brighter than the general background around and behind the display.

The edges or the corners 30 of the rectangle-shaped or square-shaped 32 display screen 13 may have an angle of between 45° to 120°. In some embodiments, the edge/corner of the rectangle-shaped or square-shaped display screen may have an angle that can be more than 45°, or 50°, 60°, 70°, 80°, 90°, 100°, 110° or 120°. In some embodiments, the edge/corner of the rectangle or square shaped display screen may have an angle that may be less than 90°, 80°, 70°, 60°, 50°, 40°, 30°, 20° or 10°. Preferably, the edge/corner 30 of the rectangle- or square-shaped 32 display screen 13 has an angle that is substantially 90°. This is advantageous because the edge/corner of an object having an angle of about 90° can be easily detected and processed by the image processor 18. Objects having sharp edges/corners around 90° can also be easily processed by the image processor 18 to determine the array of coordinates of the display. However when the control device 12 is at an angle to the display device 14 the corner angles will not appear to be 90 degrees, so the image processor should be configured to process a distorted square or rectangle and thus may use quadrilateral detection to identify a rectangular or square shaped display.

Figure 3C:
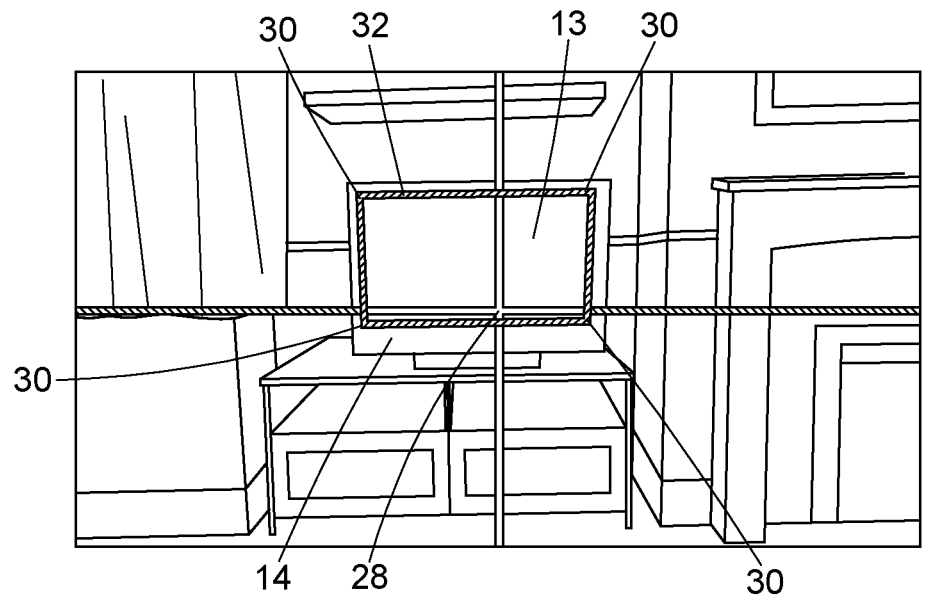

The image processor processes the captured image to determine an array of coordinates 34 that corresponds to the edges or corners 30 of the TV screen as shown in FIG. 3c. For example, an array of X, Y coordinates may represent the four corners or edges of the rectangular TV screen. The image processor can further collect and process an $n^{th}$ number of coordinates that corresponds to the outer edges of the TV screen. In some embodiments, the coordinates may be X, Y, Z coordinates. In some embodiments, the coordinates are shown as X horizontal percentage and Y vertical percentage. In some embodiments, the coordinates may be 1D, 2D or 3D coordinates.

Figure 3D:
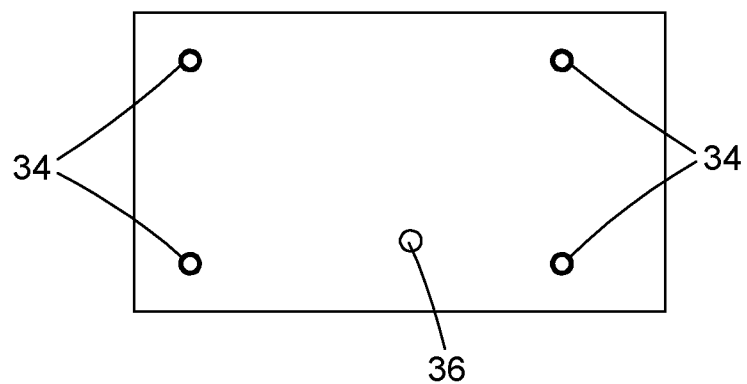

Referring to FIGS. 3c and 3d, the X horizontal percentage and Y vertical percentage coordinates of the centre image pixel 36 is calculated using a mathematical algorithm in relation to the array of the coordinates 34 corresponding to the edges or corners 34 of the display screen 13.

Figure 3E:
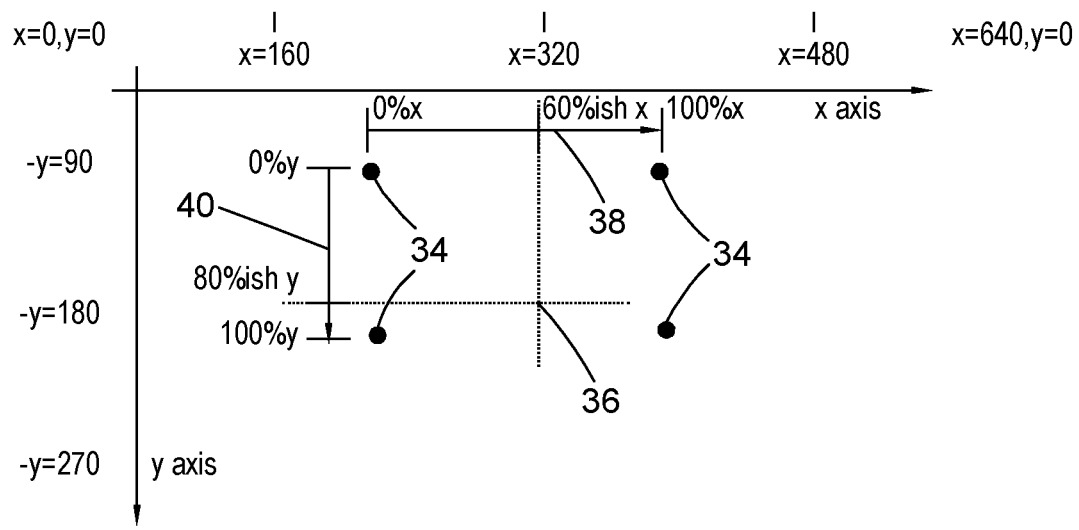

In the example as shown in FIG. 3e, the pointing alignment/position of the control device is calculated at approximately 60% along the x axis 38 and approximately 80% down the y axis 40. The image processor may calculate the percentage coordinates using a CPU/master unit on a computer or it can be calculated using a local processor built within the control device.

Referring to FIG. 4, the apparatus of the present invention can be used to detect the display screen at any angle. The captured image comprising the display screen may be distorted due to the viewing angle of the display, for example keystoning effect. This may result in one side of the rectangle of the display device being slightly shorter 42 on the camera image than another side of the rectangle 44 when viewing at an angle. As the image processor is able to determine the X, Y image pixel coordinates of the display, the image pixel coordinates of the centre of the image and is also able to know that the display screen is a fixed rectangle or square, the image processor may be used to run an algorithm to compute, with accuracy, the pointing alignment/position/angle/distance of the control device 12 in relation to the display at an angle.

To optimise the accuracy of determining the pointing alignment/position of the control device at the display screen, and to reduce processing requirements of the captured image, an image artefact can be added on top of the displayed content to make display recognition easier for the image processor, for example a white border/background around the edge of the display.

The image processor may process the image using the following algorithm:

Colour and brightness filters—Decreasing the brightness reduces the background noise and the brighter objects such as the display image continue to be well defined on the image. Removing the colour and making the image greyscale simplifies the algorithm.

The algorithm may filter to only keep a certain colour. For example if a blue border was used to enhance the outline of the display then the algorithm may use a filter to remove all captured light that is not blue.

Blob detection—The remaining strongly defined objects are recorded into an object array. These are solid patches of brightness across a reasonable size area. The algorithm may then remove all the small objects that don't match a minimum size.

Edge detection—To detect edges where the image strongly changes. This may be applied to all the blobs to turn them into Polygons.

Corner detection—The edges/corners in each blob are analysed and if they meet in a corner these corners are identified as being joined edges and are therefore corners.

Quadrilateral detection—Using the corners/edges of the display device to look for objects that have 4 corners/edges.

Square or rectangle detection—Compare the ratios and angles of the 4 sides/edges to see if they are within the limits of a rectangle or square.

Alternatively, the algorithm on the image processor may include a functionality to detect the outer frame of the display device and utilise the outer frame of the display device for image recognition to calculate the edges of the display.

Figure 5A:
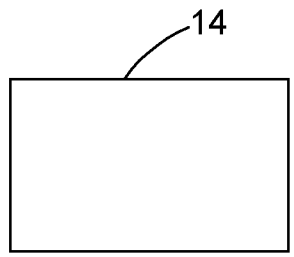
FIG. 5a shows the display device at different distance and/or angles according to FIGS. 1 to 4.
Figure 5B:
FIG. 5b shows the display device at different distance and/or angles according to FIGS. 1 to 4.
Figure 5C:
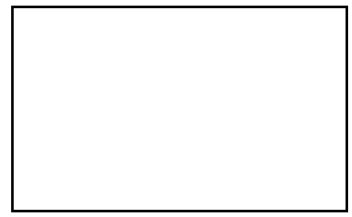
FIG. 5c shows the display device at different distance and/or angles according to FIGS. 1 to 4.

Referring to FIG. 5a to 5c, there is shown a substantially rectangular-shaped TV screen on the image. FIG. 5b shows how the shape of the TV on the image changes as the controller move further away, i.e. moves further away from the display device while FIG. 5c illustrates a typical image detected by the image detections means as the controller moves to closer to the display device.

By determining and knowing the array of coordinates of the display screen, i.e. the coordinates of the outline shape of the display screen, as described above in FIGS. 3a to 3e, and calculating an overall size of the display screen, for example the average of the 2 diagonal corner to corner points of the display, a relative z axis value (distance of the control device from the display) can be calculated as the control device moves further away or moves closer to the display.

This z axis relative value can also be provided to the electronic device as an additional input that can be utilized. An example would be a shooting computer game where the user would be moving further away or closer to a target and the electronic device, which could represent that inside the virtual world of a shooting computer game. If a z-axis distance for a particular point is known, or the size of the display is known, then the z axis relative value can be used to give a z axis distance.

Figure 5D:
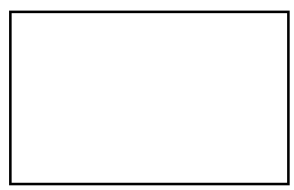
FIG. 5d shows the display device at different distance and/or angles according to FIGS. 1 to 4.
Figure 5E:
FIG. 5e shows the display device at different distance and/or angles according to FIGS. 1 to 4.
Figure 5F:
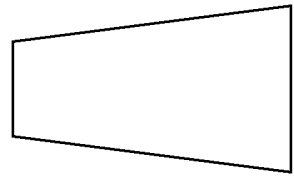
FIG. 5f shows the display device at different distance and/or angles according to FIGS. 1 to 4.
Figure 5G:
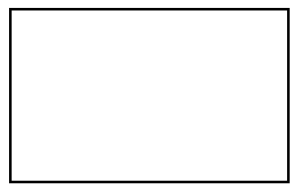
FIG. 5g shows the display device at different distance and/or angles according to FIGS. 1 to 4.
Figure 5H:
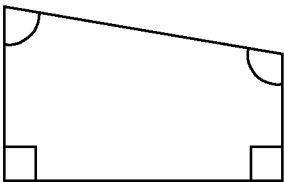
FIG. 5h shows the display device at different distance and/or angles according to FIGS. 1 to 4.

FIGS. 5d to 5f, and FIGS. 5g to 5h show examples of the display screen being viewed from different angles. As the coordinates of the corners are known using known mathematical calculations, it is then possible to calculate at what angle the display screen is being pointed at from by the control device. In the examples as illustrated in FIGS. 5d to 5f, an angle may be represented as 2 angles which can then be provided to the electronic device as additional inputs that can be utilised. The angle may be an x angle, which may represent the right and left (horizontal) pointing angle of the control device pointing at the display screen, and a y angle, which may represent an up and down (vertical) pointing angle of the control device. The angle at 0 degrees may be configured to mean straight on and −90 degrees to +90 degrees may represent 180 degrees of a viewing angle.

On the x angle, −90 degrees may be the user operating the control device looking at the display completely sideways on from the left and +90 degrees may be the user operating the control device is looking completely at the display screen sideways from the right. On the y angle −90 degrees would mean the user could be pointing the control device from the bottom and +90 degrees may be the user pointing the control device looking from the top. These inputs could be used by the electronic device in for example a shooting computer game where the user is looking through a window. By changing their pointing angle, which is provided to the computer game, it could represent the user looking through the window at a different angle and this could be shown in the computer game adding an additional user experience to the user. It is possible to generate a three dimensional effect to the user if the display content is correctly adjusted based on the known position and orientation of the control device, assuming that the view point of the user relative to the display is approximately the same as that of the control device.

The control device may be used to detect a display at any angle of at between −90° to +90°. In some embodiments, the angle may be more than −90°, −45°, 0° or +45°. In some embodiments, the angle may be less than +90°, +45°, 0° or −45°.

Figure 6:
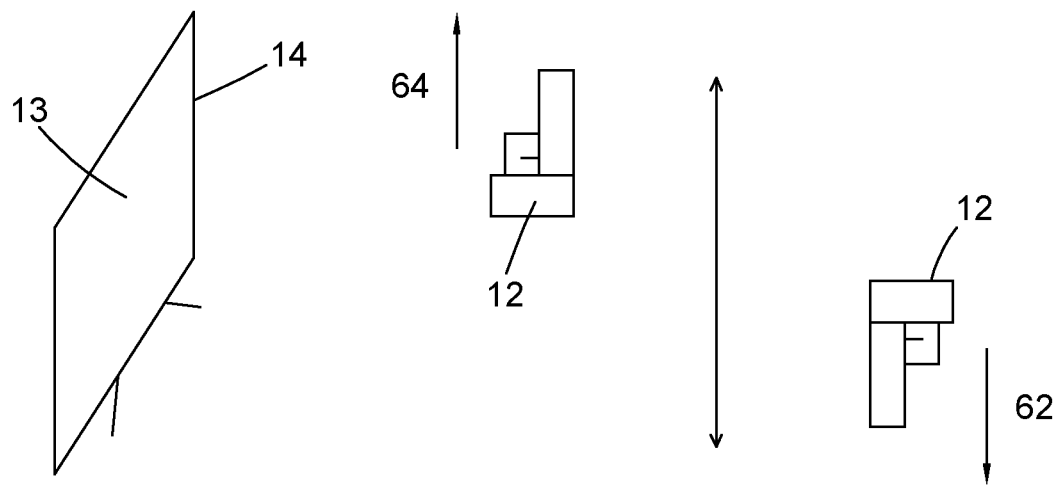
FIG. 6 shows an upward and downward direction of the control device.

Referring to FIG. 6, there is shown a control device 12 such as a gaming gun, which may comprise a gyro sensor (not shown) to provide additional input to the electronic device. This input may provide usable input when the camera is not pointing at the display screen 13 and the control device 12 is effectively blind. An example might be a cowboy shooting computer game. Where in the game the user puts their virtual gun in the holster for a cowboy duel. In some embodiments, the user may point the control device 12 in a downward direction 62, i.e. towards the floor, and then draw and shoot their gun by pointing it at the display screen 13, which can all be simulated in the virtual game for user experience. In some embodiments, the user may point the control device 12 in an upward direction 64 to simulate either cocking the gun or reloading the gun which can be simulated in the virtual game for user experience. The gyro sensor may be connected to the image processor and its output may be provided to the electronic device. The control device can have multiple gyro sensors to provide usable inputs across multiple axis.

The gyrosensors can detect if the control device has been rotated for example, upside down and can therefore communicate to the image processor that it needs to vertically flip the image to continue to provide accurate pointing coordinates.

Figure 7A:
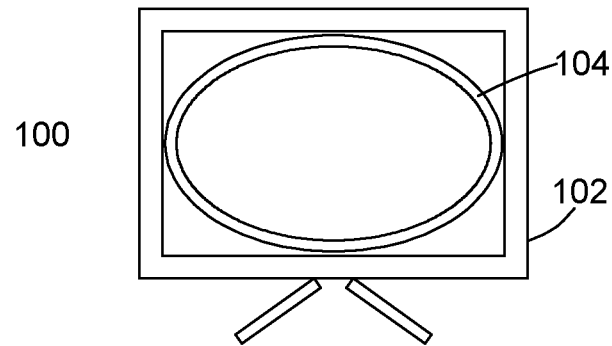
FIG. 7a shows a display with no border.
Figure 7B:
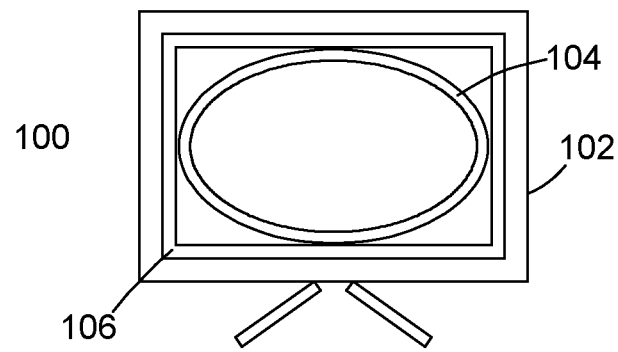
FIG. 7b shows a display with an image artefact added to the outline/edges/corner of a display content.
Figure 7C:
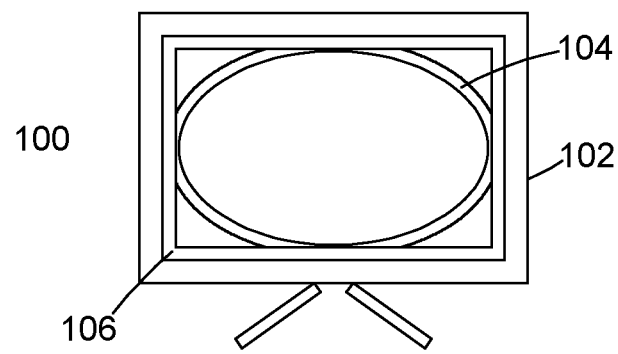
FIG. 7c shows a display with an image artefact added to the outline/edges/corner of a display content.

Referring to FIG. 7a, there is provided a television 100 containing a television bezel 102 surrounding the television display image/picture 104. Referring to FIG. 7b and FIG. 7c, a border 106 is added around the edges or corners of the display content. As shown in FIG. 7b, the original display content 104 may be resized in order to fit within border 106. The border may be detected by the detection means according to the present invention. Referring to FIG. 7c, the border may be overlayed on top of the original content.

Border

Figure 7D:
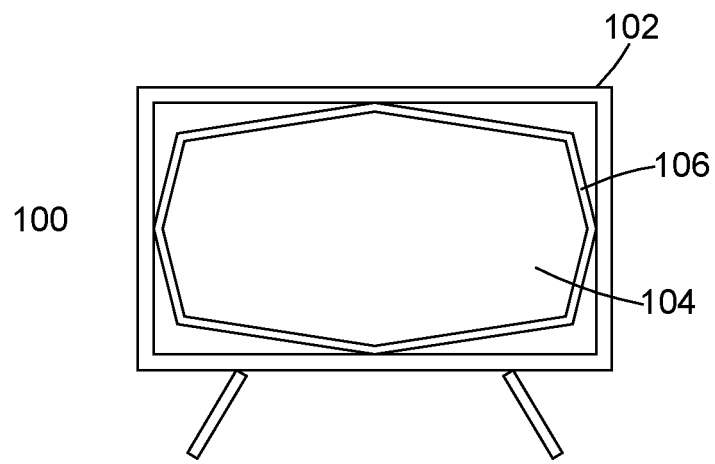
FIG. 7d shows a display with an image artefact added to the outline/edges/corner of a display content.
Figure 7E:
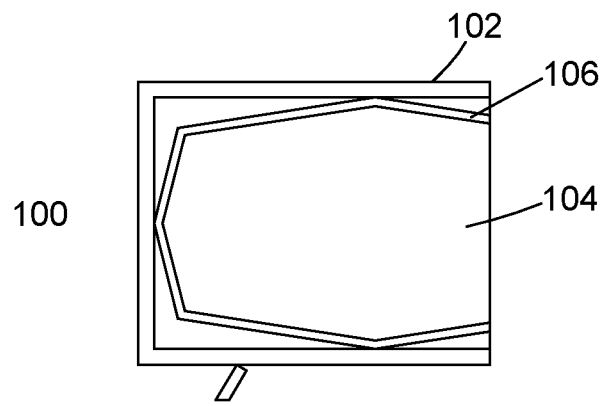
FIG. 7e shows a display with an image artefact added to the outline/edges/corner of a display content.
Figure 7F:
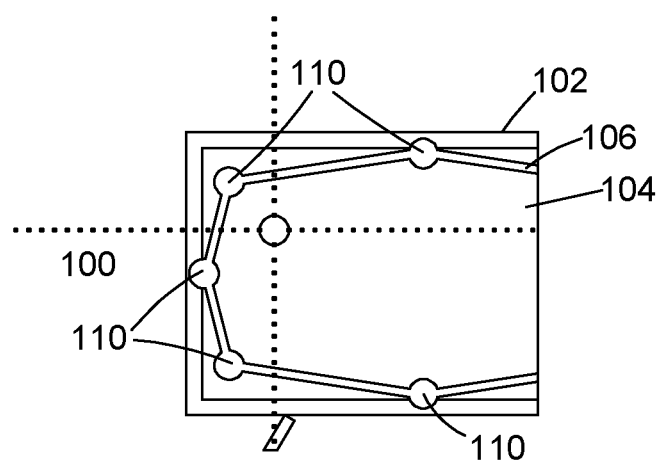
FIG. 7f shows a display with an image artefact added to the outline/edges/corner of a display content.

Referring to FIGS. 7a to 7c, an artefact for example, a background or border may be added around the edge or on top of the edge of the display content that can be detected by the imaging detection means and detected in the software using image recognition, which could be shape, colour, brightness or a pattern. In the simplest example but by no means limited to this example, a border can be a solid colour with a set number of pixels width around the edge of the display content. With additional software calculations the image recognition can also work on a partial border outline. This may be to make the border less visible to the user or because part of the border is outside of the imaging apparatus's field of view. The border makes it easier for the software to identify the rectangle, square and/or quadrilateral edge of the display area and therefore the corners of the display area. This means it can determine where the control device is pointing at the display with greater accuracy, better reliability and faster. Referring to FIGS. 7d to 7f, the border could also be made more complex, so that even if the field of view of the image detection means does not include the whole border, the portion of the border that it is visible will still contain enough information for the image processor to calculate which portion of the display it can see.

FIG. 7d shows an example of an octagonal border that is substantially rectangular in shape. This can be detected using similar image processing algorithms to detecting a quadrilateral, as described above, FIG. 7e shows an example of a captured image where the whole of the display is not visible. The display is surrounded by the same border as that shown in FIG. 7d. The additional corners at the midpoint of the display edge allow the pointing alignment to be calculated without seeing the complete display. As an example, the pixel coordinates 110 that would be identified in such a situation are highlighted in FIG. 7f.

In some embodiments, the border could be patterned and the image processing algorithm could identify the border by image recognition of the pattern. This approach may remove noise and could be used in conjunction with the shape and brightness recognition methods described above.

Polarisation

Figure 8A:
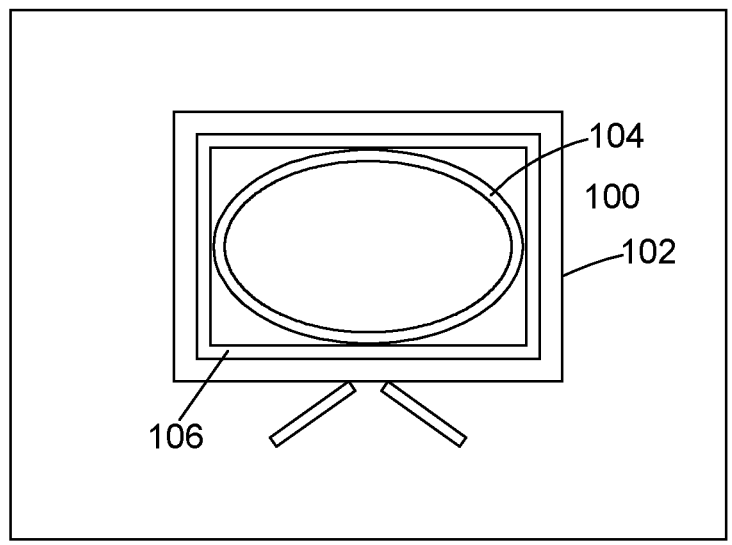
FIG. 8a shows a representation of a light polarisation filter.
Figure 8B:
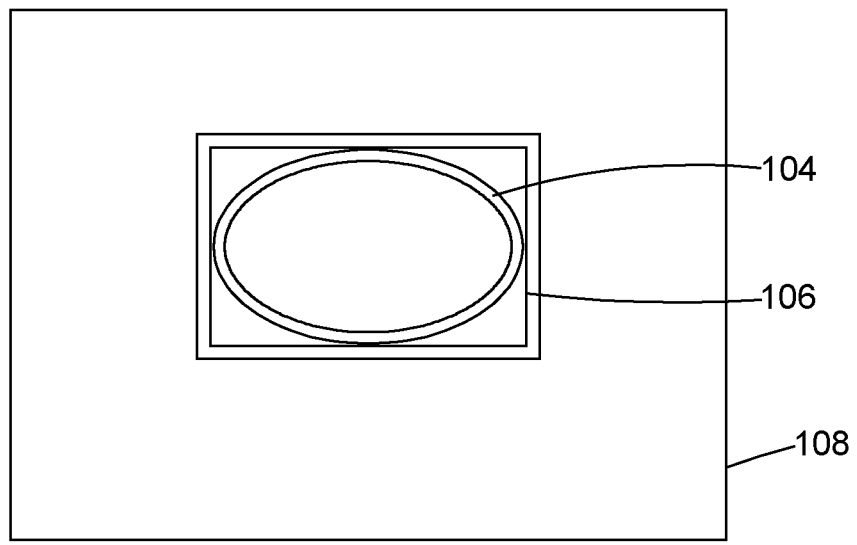
FIG. 8b shows a representation of a light polarisation filter.

The performance of the device may be improved by using an imaging apparatus capable of detecting light polarisation. LCD televisions and most other modem displays emit light that is polarised in one direction. Referring to FIGS. 8a and 8b, by manually calculating or by automatically detecting the polarisation direction of the display screen light the imaging apparatus or image processor can exclude other light that is not polarised or not polarised in the same direction as the display. This will reduce unwanted light which is providing noise to the image recognition and therefore improve performance. This technique may work especially well when combined with the adding of the rectangle border around the edge of the display screen. When the rectangle border is detected by the image recognition software the polarisation can be recorded. Then on subsequent image frames light that is not polarised in a similar direction or is not polarised at all can be excluded which should emphasise the border even more. If the imaging apparatus is rotated then the polarisation direction might no longer be accurate. If the rectangular border edge cannot be identified on an image then the polarisation exclusion will need to be removed so the rectangle border edge can be detected. However the new polarisation direction can then be identified and the exclusion used again on subsequent frames.

Referring to FIG. 8a, there is shown a television 100, a television bezel 102 surrounding the television display image/picture 104. In an example, the recorded image can be readied for processing using image recognition algorithms. Referring to FIG. 8b, a polarisation image filter 108 has been put in place in order to only keep the light from pixels where dominant polarisation direction value matches the television display light polarisation direction. This may provide a strong filter to remove unwanted light which is providing noise in relation to the image recognition.

FIG. 8b shows how this polarisation based filtering can make the image processing significantly easier, efficient, more accurate and reliable. This process does not necessarily involve changing the light polarisation of the display, but may merely involve exploiting the existing light polarisation information.

Changing the light polarisation of the display or other light sources in the vicinity of the display to for improved functionality using the above described process is also possible Alternatively, a configuration where display light is not polarised, but some of the background light is polarised, and the light polarisation of the background light is utilised to exclude it from the imaging apparatus or image processing is possible. Alternatively, it could be that the display light is polarised in one direction and the background light is polarised in a different direction and this information is utilised as described above.

In some embodiments, the image detection means may comprise two cameras adjacent to each other, one camera with a polarisation filter and the other camera without a polarisation filter, and detecting the display may comprise comparing the relative brightness of images detected by the two cameras to detect the display, which will be brighter in one image due to the filtering of polarised light.

Alternatively, instead of applying a polarisation based filter, it would be possible to aid detection of the display by recording the polarisation of light detected by the image detection means at each pixel.

Close Mode

If the detection device is being used close to the display device the imaging apparatus may be able to see the whole display screen when pointing near the middle of the display but when pointing at the edges it may not be able to see the whole display screen as some of it will be outside of the imaging device's field of view. This means the software may only be able to identify a partial rectangle outline of the display edge with the rest of the rectangle edge of the display screen outside of the image. The image recognition software can identify that the rectangle is only a partial match and that the rest of the rectangle is outside the edge of the captured image. The software can estimate where the other rectangle corners might be by assuming the rectangle is the same size as it was when it last captured a full rectangle match. The imaging device has to be able to identify at least one corner of the display screen edge for this to work. This feature would enable the device to work closer to the display screen than it otherwise would.

Example 1—Hardware GunMouse

The control device as referred to herein in these examples (below) as a GunMouse. The camera may be mounted onto the GunMouse or it may be built into the front of the GunMouse. The GunMouse may be connected to or attached to an image processor for example, a small computer or a single board computer such as a Raspberry Pi, Arduino or a custom-built computer for this purpose.

This small computer located in the GunMouse may process the images and work out where the camera is pointing at on the display screen for example a television screen. The small computer then processes the image to calculate the array of image pixel coordinates in the image representing the four corners of the display. By calculating the array of image pixel coordinates, the image processor may then be able to check and compare those coordinates against the centre image pixel coordinates of the image so that it can determine where on the display the control device is pointing at, and translate these into mouse movements which can be sent to the electronic device such as a main computer. The main computer may then provide an output signal to show where the pointing alignment/position of the GunMouse is on the display screen via an indicator such as a standard mouse cursor to display the pointing alignment/position of the GunMouse onto the display screen. The pointing alignment/position of the GunMouse on the display screen can be equal to the centre image pixel of the captured image. Usually, the main computer and the GunMouse are connected through a standard USB connection.

The GunMouse communicates to the main computer using standard mouse communication interface such as the HID standard. The version described in this example does not require any drivers different to a normal mouse and can easily be used for anything that a normal mouse can be used for. The GunMouse receives its power through the USB connection to the main computer.

Example 2—Software GunMouse

The difference with this version over Example 1 is that the camera feed is fed into the main computer where it is processed by custom software/a driver on the main computer. When the software has worked out where the mouse should point to on the display screen, it interfaces with the operating system of the main computer to create a virtual mouse which can then move and be used in all applications just like a normal mouse.

Alternatively, the main computer could feed the calculated target mouse coordinates back into the GunMouse so it can pass them back to the main computer as a standard mouse signal similar to Example 1.

The trigger and any additional buttons/controls/interactions are sent via a small serial GPIO board located in the GunMouse, which may be connected to the main computer. Both the camera and the GPIO board can be connected to the main computer most likely by a single USB connection. The custom software/driver on the main computer may process the trigger and button clicks/control operations and perform the relevant virtual mouse actions, or feed these back into the GunMouse to output back into the main computer as normal mouse and/or keyboard and/or joystick signals.

The GunMouse can communicate to the main computer if the GunMouse is actually slightly pointing away from the screen and in which direction. This information may be utilised for additional functionality for example, when in combination with a trigger event for example, reloading a gun in a computer game. This is known as off-screen reload.

Example 3—Mouse Coordinates

The gun mouse primarily deals with horizontal and vertical percentages when calculating coordinates as it does not know the resolution or aspect ratio of the screen. The HID mouse standard supports these absolute percentages. For example (0,0) represents the top left of the display and (65535,65535) represents the bottom right. If the GunMouse is pointed around the middle of the screen, which gives x horizontal percentage of 50% and a y vertical percentage of 50%, the centre of the display screen would be communicated as (32767,32767) absolute coordinates to the main computer. The software having worked out the horizontal and vertical percentages may pass that in as a percentage of 65535. The main computer operating system may then use the provided absolute mouse coordinates to move the mouse cursor to the correct location on the screen, which in this example is the centre of the display.

However some devices/computers may not properly support absolute mouse coordinates. The GunMouse can be configured to use relative mouse coordinates but it may need to know the horizontal and vertical total pixel count. On a software GunMouse as described in Example 2 above, this can be detected on the main computer so can be easily utilised for moving the mouse.

On the hardware mouse as described in Example 1, this may have to be inputted some way. For example controls on the GunMouse, a connection cable between the main computer and the GunMouse computer to pass the setting, or an SD card slot on the GunMouse where a user can change a setting on the SD card.

Example 4—GunMouse for Modern Gaming

It may be possible to use the GunMouse in combination with another game controller in a computer game. For instance, it may possible for a user to move a 3D first person perspective computer player using a joystick with one hand and shoot targets using a GunMouse in the other hand. The GunMouse can be compatible with any console games and PC games. The control device may be configured to interact with other accessory items for example a gaming accessory such as a pedal.

Example 5—Playing Classic Lightgun Computer Games

The GunMouse can be connected to a main computer where it is providing mouse input. The main computer can run emulation software that is able to run classic or retro computer games. It is a standard feature of classic computer game emulators that lightgun games can be controlled by a mouse. This is because classic lightgun technology does not work on modem display devices and this is an alternative way to play but not as much fun for the user.

The GunMouse can be used with this software as it is interpreted then becomes a mouse. The user interaction then becomes exactly the same as a classic lightgun in that it does not require additional external hardware to be used along with the gun and it does not require calibration. This is more fun for the user and a similar user experience to the original user experience.

The GunMouse when configured to be a mouse can be configured to constantly move the mouse cursor in line with where it is pointing at the display or only move the cursor when the trigger is actioned. When moving when the trigger is actioned the mouse cursor would be moved first when the trigger is actioned and then the mouse click event would be applied. These 2 modes are useful because some classic light gun games constantly showed a moving cursor that represented where the gun was pointing and some classic light games only interacted with the game when the trigger was actioned. On the latter if you had a cursor showing where the gun is pointing this would be different to the original user experience however the option is there for the user if they want to play in that mode.

It may not be a requirement to show a cursor or a crosshair on the display screen as the computer may still interact with the GunMouse without it. This is a user preference.

Example 6—GunMouse in Presentations, Training and Education

Whilst the GunMouse may be used for playing computer games, the GunMouse may give opportunity for lots of new ways to interact with a computer. For example a user could utilise it for a computer presentation to increase interest. Optionally, the user may use the GunMouse to shoot down targets representing company business targets that had been achieved.

The GunMouse could be used for training and education as it may provide new ways to simulate real world interactions virtually.

It will be appreciated that the number of image detection means and/or image processors may vary substantially. The number of additional buttons on the control device may also vary substantially. The array of coordinates processed by the image processor can vary substantially.

Various further aspects and embodiments of the present invention will be apparent to those skilled in the art in view of the present disclosure.

All documents mentioned in this specification are incorporated herein by reference in their entirety.

The terms "centre pixel coordinate" and "image pixel coordinates of the centre of the captured image" as defined herein are to be taken to mean any pixel coordinates on a given image which are not towards the extremes of the display on which that image is being displayed, and should not be construed to mean pixel coordinates at exactly the centre of the image.

The term "display" as defined herein is to be taken to mean the area of a display device on which content is displayed, and does not include, for example, the physical border surrounding a television screen.

The term "border" as defined herein is to be taken to mean any artefact that is applied to a display of a display device and which completely surrounds at least a portion of the display of that display device. Similarly, the term "partial border" as defined herein is to be taken to mean any such artefact which partially surrounds at least a portion of the display of a display device. Such borders and partial borders need not necessarily be continuous, and may for example comprise dotted lines applied to surround or partially surround a portion of a display.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

The term "comprising" encompasses "including" as well as "consisting" e.g. a composition "comprising" X may consist exclusively of X or may include something additional e.g. X+Y.

The word "substantially" does not exclude "completely" e.g. a composition which is "substantially free" from Y may be completely free from Y. Where necessary, the word "substantially" may be omitted from the definition of the invention.

The term "about" in relation to a numerical value x is optional and means, for example, x±10%.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

The invention claimed is:

1. A method for detecting a display, the method comprising the steps of:
    applying a border to completely surround display content within a display area of the display, wherein the applied border is configured to aid the detection of the display;
    receiving an image signal from an image detection means;
    detecting, by an image processor, that the received image signal comprises an image of at least a portion of a display;
    determining, by the image processor, an array of pixel coordinates of the received image signal that define at least a part of an outline of the display;
    calculating, based on the array of pixel coordinates and at least one centre pixel of the received image signal, an orientation of the image detection means in relation to the display; and
    in response to calculating the orientation of the image detection means, communicating a pointing alignment of the image detection means relative to the display to a processor in communication with the display, and
    wherein the border surrounds the display content within the display area by being overlayed on an edge of the display content that is detected by the imaging detection means.

2. The method of claim 1, wherein the processor in communication with the display is configured to position an indicator on a display content area of the display based on the received pointing alignment.

3. The method of claim 1, further comprising adjusting the content of the display content area of the display for improved recognition by the image processor.

4. The method of claim 3, wherein adjusting the content comprises applying a colour and/or brightness adjustment to the whole of the display content area.

5. The method of claim 3, wherein adjusting the content comprises applying a colour and/or brightness adjustment to only a part of the display content area.

6. The method of claim 5, wherein the colour and brightness adjustments are applied to portions of the display based on the values of one or more pixels in those portions.

7. The method of claim 1, wherein the image detection means is configured to detect the polarisation of light impinging on the image detection means, and wherein the image processor is configured to detect the display based at least in part on the detected polarisation.

8. The method of claim 1, further comprising calculating a distance between the image detection means and the display based on the array of pixel coordinates, detecting a change in the distance between the image detection means and the display, and adjusting the content of the display based on the change in distance.

9. The method of claim 1, further comprising calculating a relative angle between the image detection means and the display based on the array of pixel coordinates, detecting a change in the relative angle between the image detection means and the display, and adjusting the content of the display based on the change in angle.

10. The method of claim 1, wherein the step of detecting that the received image signal comprises an image of at least a portion of the display comprises analysing the image based on one or more parameters detected, wherein the parameters include at least one of: contour size, position, intensity, colour, flickering, refresh rate, light frequency, brightness, velocity, shape, outline, edge, angle, contrast, light polarisation, and/or size of the display.

11. An apparatus for detecting a display configured to carry out the method of claim 1, the apparatus comprising:
an image detection means;
an image processor configured to be in wired or wireless communication with a display;
a pointing device configured to be in a fixed orientation with respect to the image detection means; and/or
a trigger input configured to be in wired or wireless communication.

12. The apparatus of claim 11, wherein the apparatus is configured to communicate with the display to provide the functionality of a lightgun.

13. A computer-readable medium comprising instructions which, when executed by a processor, cause the processor to carry out the method of claim 1.

14. The method of claim 1, further comprising in response to a blind status of the image detection means, receiving a signal of at least one gyro sensor.

15. The method of claim 14, wherein the blind status of the image detection means is that the image detection means is not pointing at a screen of the display.

16. The method of claim 1, wherein an original display content is resized in order to fit within the border.

17. The method of claim 1, wherein the border is detected by the imaging detection means, and the image processor recognizes at least one of a plurality of predetermined shapes of the border, such that when a view range of the image detection means includes a part of the border, the pointing alignment is calculated for the other part of the border which is not within the view range of the image detection means.

* * * * *